US011185931B2

(12) United States Patent
Andoh et al.

(10) Patent No.: US 11,185,931 B2
(45) Date of Patent: Nov. 30, 2021

(54) CUTTING INSERT

(71) Applicant: NGK SPARK PLUG CO., LTD., Nagoya (JP)

(72) Inventors: Naoki Andoh, Nagoya (JP); Takuya Hasegawa, Nagoya (JP); Takashi Fujimoto, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 206 days.

(21) Appl. No.: 16/631,305

(22) PCT Filed: May 11, 2018

(86) PCT No.: PCT/JP2018/018292
§ 371 (c)(1),
(2) Date: Jan. 15, 2020

(87) PCT Pub. No.: WO2019/017049
PCT Pub. Date: Jan. 24, 2019

(65) Prior Publication Data
US 2020/0206828 A1  Jul. 2, 2020

(30) Foreign Application Priority Data

Jul. 18, 2017 (JP) .............................. JP2017-139487

(51) Int. Cl.
*B23B 27/16* (2006.01)
*B23B 27/22* (2006.01)
*B23B 27/14* (2006.01)

(52) U.S. Cl.
CPC .......... *B23B 27/1651* (2013.01); *B23B 27/22* (2013.01); *B23B 27/145* (2013.01);
(Continued)

(58) Field of Classification Search
None
See application file for complete search history.

(56) References Cited

U.S. PATENT DOCUMENTS 3,142,110 A * 7/1964 Hertel ..................... B23B 27/16
407/114
4,074,949 A * 2/1978 Hochmuth .......... B23B 27/1614
407/100
(Continued)

FOREIGN PATENT DOCUMENTS

| JP | 11156606 A | * | 6/1999 | |
| JP | 2008229744 A | * | 10/2008 | |
| WO | WO-2015137509 A1 | * | 9/2015 | ........... B23B 27/145 |

OTHER PUBLICATIONS

NGK Spark Plug Co., Ltd., "2017-2018 General Cutting Tool Catalog (NGK)," issued in 2016, Column "H/SS Small Parts, Front Turning" (Part No. TF3300R, TF3305R, TF3315R, TF3320R), p. 39.

(Continued)

*Primary Examiner* — Saraaddisu
(74) *Attorney, Agent, or Firm* — Stites & Harbison, PLLC; Jeffrey A. Haeberlin

(57) ABSTRACT

A cutting insert has cutting edges having the same shape and provided at respective corners of a polygon in rotational symmetry about the center axis of the polygon, is clamped in an upright position to a holder, and has a negative side rake angle on a rake face of a side cutting edge. A side cutting edge is present at an intersection ridge between a polygonal face and an outer peripheral face. The outer peripheral face includes a rake face of the cutting edge and a flank of an end cutting edge of another cutting edge different from the side cutting edge. The flank has a positive slope angle in opposition to a negative side rake angle of the side cutting edge. A breaker groove extending in a front-rear direction is formed in the rake face and cuts into the flank, in such a manner as to divide the rake face.

7 Claims, 8 Drawing Sheets

(52) U.S. Cl.
CPC ..... *B23B 27/1622* (2013.01); *B23B 2200/086* (2013.01); *B23B 2200/369* (2013.01)

(56) References Cited

U.S. PATENT DOCUMENTS

| | | | | |
|---|---|---|---|---|
| 4,294,566 | A * | 10/1981 | Boone | B23B 27/1622 407/114 |
| 5,032,050 | A * | 7/1991 | Niebauer | B23B 27/045 407/114 |
| 7,494,303 | B2 * | 2/2009 | Koskinen | B23C 5/2221 407/113 |
| 8,277,151 | B2 * | 10/2012 | Wandeback | B23C 5/06 407/42 |
| 8,282,320 | B2 * | 10/2012 | Hartlohner | B23B 27/1618 407/113 |
| 8,454,278 | B2 * | 6/2013 | Hartlohner | B23C 5/2217 407/113 |
| 8,678,718 | B2 * | 3/2014 | Hecht | B23B 27/1614 407/117 |
| 8,814,479 | B2 * | 8/2014 | Kaufmann | B23B 27/04 407/102 |
| 9,327,351 | B2 * | 5/2016 | Inoue | B23B 29/043 |
| 9,981,323 | B2 * | 5/2018 | Fang | B23C 5/2221 |
| 10,350,688 | B2 * | 7/2019 | Rue | B23C 5/22 |
| 2005/0063792 | A1 * | 3/2005 | Satran | B23C 5/2213 407/113 |
| 2008/0044241 | A1 * | 2/2008 | Koskinen | B23C 5/06 407/103 |
| 2008/0273931 | A1 * | 11/2008 | Spitzenberger | B23C 5/207 407/51 |
| 2009/0136304 | A1 * | 5/2009 | Satran | B23C 5/207 407/104 |
| 2009/0155005 | A1 * | 6/2009 | Jansson | B23C 5/202 407/114 |
| 2010/0129166 | A1 * | 5/2010 | Hartlohner | B23B 27/1618 407/102 |
| 2011/0020080 | A1 * | 1/2011 | Zettler | B23C 5/207 407/113 |
| 2011/0052337 | A1 * | 3/2011 | Dudzinsky | B23C 5/2204 407/40 |
| 2012/0195700 | A1 * | 8/2012 | Chen | B23C 5/2221 407/40 |
| 2013/0108387 | A1 * | 5/2013 | Ishi | B23C 5/109 409/132 |
| 2013/0183110 | A1 * | 7/2013 | Schaefer | B23B 27/1659 407/102 |
| 2013/0336735 | A1 * | 12/2013 | Nam | B23C 5/207 407/113 |
| 2014/0064864 | A1 * | 3/2014 | Kaufmann | B23B 27/141 407/114 |
| 2014/0348599 | A1 * | 11/2014 | Kovac | B23C 5/207 407/42 |
| 2015/0117968 | A1 * | 4/2015 | Brunetto | B23C 5/207 407/42 |
| 2015/0158089 | A1 * | 6/2015 | Inoue | B23B 27/143 82/1.11 |
| 2017/0144235 | A1 * | 5/2017 | Dagan | B23C 5/06 |

OTHER PUBLICATIONS

Japan Patent Office, International Search Report issued in corresponding Application No. PCT/JP2018/018292 dated Aug. 7, 2018.

* cited by examiner

CUTTING INSERT

TECHNICAL FIELD

The present invention relates to a cutting insert (a cutting tip of the throwaway type (replaceable type), etc.) for use in performing external machining by lathe turning on a workpiece such as a metal round bar, particularly to a cutting insert which is applicable to external machining for tapering the outer circumferential surface of a workpiece from a large diameter to a small diameter and to external machining, including copying, for imparting a continuously changing outside diameter to a workpiece and which has a polygonal plate-like shape and is clamped in an upright position to a holder.

BACKGROUND ART

Among cutting inserts (hereinafter, may be called inserts) which have a polygonal plate-like shape, are clamped (fixed) in an upright position to the holder, and is used for above-mentioned external machining, for example, a cutting insert having a triangular plate-like shape has a cutting edge at each corner of a triangle with a rake face present on the outer peripheral face thereof. Regarding prior art documents about such an insert, no "patent document" exists (in spite of search) pertaining to an insert (an insert not used for cutting off and grooving, but used for external machining and having a triangular plate-like shape and clamped in an upright position) in which a cutting edge has a side cutting edge (major cutting edge) extending rearward from its nose (front end) along one side (a polygonal face) of its rake face, and an end cutting edge (minor cutting edge) extending obliquely rearward from the front end of the side cutting edge in such a manner as to form an acute angle with the side cutting edge. However, a catalog issued by an applicant of the present invention who manufactures and markets cutting tools which contain cutting inserts, etc., clearly shows the insert as a product of the applicant (see, for example, Nonpatent Document 1).

In such an insert, three cutting edges provided at respective corners are usually formed rotationally symmetrically about the center axis of a triangle (rotational symmetry of 120 degrees), and in application to external machining, the insert is clamped to the holder in an upright position, thereby forming a cutting tool. Such a cutting tool is fixedly disposed on a tool rest of a lathe such that the side cutting edge is, for example, approximately perpendicular to the axis of a spindle of the lathe; the end cutting edge is rendered to face the outer circumferential surface of a workpiece and to have a predetermined depth of cut (longitudinal feed); then, the cutting tool is relatively cross-fed (moved in a direction along the axis of the spindle), thereby performing external machining. In response to expiration of service life of the cutting edge (tool edge) in the course of machining, tool edges are changed; specifically, the cutting edge is sequentially replaced with that having the same shape of another corner for application to machining.

Meanwhile, usually, a pocket (recess) of the holder in which the above-mentioned cutting insert (triangular tip) is clamped in an upright position opens toward a side portion of a head of the holder (shank) (one side located toward a main spindle of the lathe) and has a V-shaped seating surface which opens upward (toward a rake-face side) and a far-side side wall facing laterally. FIG. 10 illustrates a state in which the above-mentioned cutting insert (triangular tip) 10 is clamped in the pocket of the above-mentioned holder 400.

As shown in FIG. 10-A, the cutting insert (triangular tip) 10 is clamped in an upright position by placing one polygonal face (plate face) 150 of the triangular tip against a side wall 415 of the pocket of the holder 400, seating two sides (peripheral faces) extending from its corner on a V-shaped seating surface 413, inserting a clamp screw (set screw) 450 through, for example, a clamp hole provided at the center of a triangle (polygonal face), and screwing the clamp screw into a threaded hole provided in the side wall 415 of the pocket. By virtue of clamping in an upright position on the V-shaped seating surface 413, even in high-load external machining involving large cutting resistance (large main component of force to be generated) as a result of employment of a large depth of cut, the cutting insert 10 is stably clamped.

In some cases, the V-shaped seating surface 413 for clamping the insert 10 is not perpendicular to the side wall 415, but is inclined (reverse-tapered) in such a manner as to be widened vertically and horizontally toward the side wall 415 located on the far side of the seating surface 413 (see the broken lines indicative of the seating surface 413 in FIG. 10). In the triangular tip 10 to be clamped in such a pocket, faces between the adjacent corners (outer peripheral faces along the sides of a triangle) are formed so as to correspond to the inclination (reverse taper) of the seating surface 413 such that the triangular face (polygonal face) 150 to be pressed against the side wall is slightly greater in size than a triangular face (polygonal face) 140 located opposite the triangular face 150 and on the same side as the side cutting edge. Accordingly, a rake face 120 of each outer peripheral face between the corners slopes (reversely tapers) to have a negative side rake angle such that the rake face 120 slopes downward toward a side cutting edge 210; i.e., slopes upward toward a side opposite the side cutting edge 210. By virtue of such inclination of the seating surface 413 and the rake faces 120, even when a large cross feed component of force F in high-load machining is imposed on the insert 10 clamped in the pocket, a positional shift or separation of the insert 10 from the side wall is prevented.

Meanwhile, in performing external machining by use of the cutting insert 10 with a large depth of cut (high-load machining), a generated chip has a width corresponding to the depth of cut. Such a wide chip is unlikely to break and rather tends to extend while curling, thereby damaging the machined surface of a workpiece as a result of contact with the machined surface with a resultant deterioration in surface roughness or a like problem. Thus, even in such machining, how smoothly the discharge of a chip is treated is important. In order to enhance chip discharge treatment (hereinafter, called chip treatability), the insert 10 has a breaker groove (chip breaker groove) 30 provided in its rake face 120. Usually, the breaker groove 30 is conventionally formed by grinding with a grindstone (a circular rotary grindstone) in the course of manufacturing the insert. The breaker groove 30 is depressed in the rake face 120 and extends rearward from a tool tip along the side cutting edge 210 with a predetermined groove width, and is rounded upward in relation to the rake face by the nature of grinding with the grindstone.

PRIOR ART DOCUMENT

Nonpatent Document

Nonpatent Document 1: Issued by NGK Spark Plug Co., Ltd., "2017-2018 General Cutting Tool Catalog (NGK),"

issued in 2016, Column "H/SS Small Parts, Front Turning" (Part No.: TF3300R, TF3305R, TF3315R, TF3320R), p. 39.

SUMMARY OF THE INVENTION

Problem to be Solved by the Invention

In the above-mentioned conventional cutting insert 10 having the breaker groove 30, chip treatability is insufficient, and a chip is apt to come into contact with the machined surface. This is for the following reason. According to the breaker groove 30 having the above-mentioned shape and structure, a chip generated by cutting with the side cutting edge 210 is pressed against the bottom of the breaker groove 30 and against the side wall of the groove located opposite the side cutting edge 210, and, as viewed from the rake face 120 side, is discharged in a direction approximately perpendicular to the side cutting edge 210 and moves on to the rake face 120 after getting out of the groove 30. Meanwhile, as mentioned above, the rake face 120 has a negative side rake angle (upward slope) such that the rake face 120 slopes upward toward a side opposite the side cutting edge 210. Although the negative side rake angle is not a very large slope angle, the rake face 120 onto which a chip moves is, so to speak, an obstacle to the flow of the chip. Accordingly, the rake face 120 hinders the flow of the chip moving away from the machined surface; as a result, chip treatability becomes insufficient, and the chip is apt to come into contact with the machined surface.

According to one of measures for solving such a problem, the rake face 120 slopes in such a manner as to have a positive side rake angle; i.e., the rake face 120 slopes upward toward the side cutting edge 210 or downward toward a side opposite the side cutting edge 210; however, imparting such slope to the rake face 120 causes deterioration in clamping force when a large cross feed component of force F in cutting is imposed on the clamped insert 10. As a result, in external machining with a large depth of cut, the insert 10 is highly likely to move or separate from the side wall. That is, the above-mentioned conventional cutting insert involves a trade-off such that the employment of a positive side rake angle in place of a negative side rake angle of the side cutting edge employed for enhancing clamping force enhances chip treatability but decreases a clamping force of the insert.

The present invention has been conceived in view of the above problem, and an object of the invention is to provide a cutting insert which is used for performing external machining with a large depth of cut accompanied by tapering from a large diameter to a small diameter and is clamped in an upright position to a holder and in which while a negative side rake angle (reverse taper) is imparted to the rake face of a side cutting edge on an outer peripheral face for providing a large clamping force, excellent chip treatability is implemented.

Means for Solving the Problem

The present invention described in claim 1 is a cutting insert which has an approximately polygonal plate-like shape and is used for external machining and in which cutting edges are formed at respective corners of the polygonal cutting insert in the same shape and in rotational symmetry about a center axis of the polygonal cutting insert with their rake faces present on respective outer peripheral faces of the polygonal cutting insert, characterized in that: each of the cutting edges includes a side cutting edge formed along an intersection ridge between one polygonal face and the outer peripheral face between two adjacent corners, and an end cutting edge formed at the corresponding corner in such a manner as to form an acute angle with the side cutting edge with a nose intervening therebetween; the outer peripheral face between the two adjacent corners includes a rake face of a certain cutting edge associated with the outer peripheral face and a flank of the end cutting edge of another, adjacent cutting edge, and the rake face of the certain cutting edge has a negative side rake angle such that the rake face slopes downward toward the side cutting edge and upward toward a side opposite the side cutting edge between the end cutting edge of the certain cutting edge and the end cutting edge of the other, adjacent cutting edge located rearward of the end cutting edge of the certain cutting edge; the flank of the end cutting edge of the other, adjacent cutting edge has a positive slope in opposition to the slope having the negative side rake angle such that the flank slopes downward toward a side opposite the side cutting edge; and a breaker groove is formed on the rake face of the certain cutting edge such that the breaker groove extends rearward along the side cutting edge from a front end of the side cutting edge and cuts into the positively sloped flank of the end cutting edge of the other, adjacent cutting edge, thereby dividing the rake face into front and rear portions.

The present invention described in claim 2 is a cutting insert according to claim 1, wherein the breaker groove is formed such that, at a position which is located near a rear end of the breaker groove and at which the breaker groove divides the rake face into the front and rear portions, a side wall of the breaker groove along the side cutting edge extends toward a side opposite the side cutting edge.

The present invention described in claim 3 is a cutting insert according to claim 1 or 2, wherein the breaker groove is formed such that a lowest portion of a groove bottom recedes from the side cutting edge with increasing distance rearward from the front end of the side cutting edge.

The present invention described in claim 4 is a cutting insert according to any one of claims 1 to 3, wherein the side cutting edge is formed such that, in a predetermined range extending rearward from the front end of the side cutting edge, the side cutting edge descends in relation to the rake face with increasing distance rearward from the front end, and the breaker groove cuts into the flank such that the position of a front end of an intersection ridge between the flank and a side wall defining the breaker groove, facing the side cutting edge, and cutting into the flank is located opposite a rear end of the predetermined range or its vicinity with the breaker groove intervening therebetween.

The present invention described in claim 5 is a cutting insert according to claim 4, wherein the breaker groove is formed such that the breaker groove has a groove width which increases with increasing distance rearward from the front end of the side cutting edge, up to the rear end of the predetermined range or its vicinity and which decreases toward the rear end of the breaker groove in a region near the rear end of the breaker groove.

The present invention according to claim 6 is a cutting insert according to claim 4 or 5, wherein the breaker groove is formed such that a groove depth from the side cutting edge to the lowest portion of the groove bottom increases with increasing distance rearward from the front end of the side cutting edge, up to the rear end of the predetermined range or its vicinity and such that the lowest portion of the groove bottom ascends with increasing distance rearward from the rear end or its vicinity at which the groove depth is the deepest.

The present invention described in claim 7 is a cutting insert according to any one of claims 1 to 6, wherein a hole for allowing insertion of a clamp screw therethrough is formed therein at centers of the polygonal faces.

Effects of the Invention

In the cutting insert of the present invention described in claim 1, the side cutting edge serving as a major cutting edge for performing external machining slopes (reversely tapers) to have a negative side rake angle; thus, cutting by the cutting insert clamped in an upright position in the pocket (pocket of the holder) corresponding to the slope is free from a problem of deterioration in clamping force caused by a cross feed component of force. Moreover, since the breaker groove has the above-mentioned shape and structure; specifically, the breaker groove cuts, at its rear end, into the flank having a positive slope in opposition to the slope of the rake face, a chip to be generated can be discharged rearward through an invasive cut portion (the rear end of the breaker groove) serving as an outlet. Therefore, chip treatability can be enhanced accordingly. Specifically, the breaker groove of the certain cutting edge associated with the outer peripheral face cuts into the flank of the end cutting edge (hereinafter, may be called an end flank) of another cutting edge rearwardly adjacent to the certain cutting edge, and the rear end of the invasive cut portion of the breaker groove serves as an outlet (passage) for discharging a chip rearward. Thus, even though the cutting insert of the present invention has the breaker groove as in the case of the conventional cutting insert, the breaker groove allows a chip to be smoothly discharged through the invasive cut portion serving as an outlet or passage in a direction receding from the side cutting edge, in contrast to the conventional cutting insert in which, since the breaker groove does not have such an invasive cut portion and is rounded upward at its rear end in relation to the rake face having a negative slope, a chip moves on to the rake face, resulting in poor chip treatability. In this manner, the cutting insert of the present invention does not involve deterioration in clamping force. Also, since chip treatability is enhanced, contact of a chip with a machined surface (finished surface) is prevented, and deterioration in machined-surface roughness is prevented.

In the cutting insert described in claim 2, the breaker groove is formed such that, at a position which is located near the rear end of the breaker groove and at which the breaker groove divides the rake face into the front and rear portions, a side wall (groove wall) of the breaker groove along the side cutting edge extends toward a side opposite the side cutting edge; thus, by virtue of the presence of the side wall facing opposite the side cutting edge, a chip can be actively led toward the side opposite the side cutting edge. Therefore, contact of the chip with a machined surface can be further reduced. The breaker groove may be formed such that the lowest portion (the deepest portion in a cross section) of the bottom of the breaker groove extends rearward from the front end of the side cutting edge in parallel with the side cutting edge and cuts into the flank in a region located toward the rear end of the breaker groove; however, preferably, as in the present invention described in claim 3, the breaker groove is formed such that the lowest portion of the groove bottom recedes from the side cutting edge with increasing distance rearward from the front end of the side cutting edge. Through employment of such a structure, a chip can be further actively led toward the side opposite the side cutting edge. Since a chip to be discharged in cutting tends to flow rearward along the deepest portion of the groove bottom, through formation of the breaker groove such that the deepest portion of the groove bottom is continuous in the front-rear direction, the flow of the chip can be actively controlled such that the chip flows in a direction receding from the outer circumferential surface of a workpiece during machining. Notably, in the present invention, the end cutting edge forming an acute angle with the side cutting edge may have a wiper (flat drag) at its nose (corner) connected to the side cutting edge.

In the present invention, the side cutting edge may extend rearward from its front end (tip) while maintaining the same level; however, preferably, as in the present invention described in claim 4, the side cutting edge is formed such that, in a predetermined range extending rearward from the front end of the side cutting edge (for example, length range of an effective edge portion of the side cutting edge), the side cutting edge descends in relation to the rake face with increasing distance rearward from the front end, whereby cutting resistance can be reduced with resultant improvement of cutting quality. In this case, preferably, the breaker groove cuts into the flank such that the position of a front end of an intersection ridge between the flank and the side wall defining the breaker groove, facing the side cutting edge, and cutting into the flank is located opposite the rear end of the predetermined range or its vicinity with the breaker groove intervening therebetween. As a result of employment of such a structure, the position of the upper end of the side wall defining the breaker groove and facing the side cutting edge becomes higher than the position of the upper end of the side cutting edge located opposite the upper end of the side wall, with increasing distance rearward in the predetermined range. Such a structure hinders flow of a chip in a direction receding from a machined surface, but enhances a curling action of the chip. According to such a structure, in a portion of the side wall facing the side cutting edge and located rearward of the rear end of the predetermined range or its vicinity, the height of the side wall sharply decreases because the breaker groove cuts into the flank; as a result, since the curled chip can be actively led to the invasive cut portion of the breaker groove, the curled chip can be actively led in a direction receding from the machined surface.

In the present invention described in claim 4, preferably, as in the present invention described in claim 5, the breaker groove is formed such that the breaker groove has a groove width which increases with increasing distance rearward from the front end of the side cutting edge, up to the rear end of the predetermined range or its vicinity and which decreases toward the rear end of the breaker groove in a region near the rear end of the breaker groove. In external machining with the side cutting edge as a major cutting edge, the greater the longitudinal feed (the depth of cut), the greater the width of a chip; i.e., the less likely the breakage of the chip. Thus, as in the present invention described in claim 5, by means of the width of the breaker groove as viewed in a cross section being gradually increased toward the rearward end, chip treatability for wide chips can be enhanced. Meanwhile, since a length up to the rear end of the above-mentioned predetermined range (or its vicinity) is usually set as the maximum depth of cut of the cutting insert, a role of controlling or limiting a direction of discharge of a chip may be imparted to a rear end portion of the breaker groove located rearward of the rear end of the predetermined range (or its vicinity). For impartment of such a role, preferably, the groove width of the breaker groove reduces gradually toward the rear end of the breaker groove in a region located toward the rear end of the breaker groove.

In order to further enhance treatability of a wide chip, in the present invention described in claim 4 or 5, preferably, as in the present invention described in claim 6, the breaker groove is formed such that the groove depth from the side cutting edge to the lowest portion of the groove bottom increases with increasing distance rearward from the front end of the side cutting edge, up to the rear end of the predetermined range or its vicinity and such that the lowest portion of the groove bottom ascends with increasing distance rearward from the rear end or its vicinity at which the groove depth is the deepest.

The cutting insert of the present invention having a hole as described in claim 7 yields the following characteristic effect. For simplification of structure, etc., preferably, the cutting insert of the present invention assumes the form of a tip having a hole and is clamped in the pocket of the holder by screwing a clamp screw. Meanwhile, in the tip having a hole, a wall portion (wall thickness) between the inner circumferential surface of the hole located between corners and an outer peripheral face of the insert is thinner than wall portions near the corners. As a result, in the case of an insert manufactured by sintering a compact, outer peripheral faces corresponding to the thin-walled portions between corners of the insert tend to swell, though by a small amount; thus, the insert involves a resultant problem about shape and dimensional accuracy. This is for the following reason: in manufacture of a green compact for the insert, the thin-walled portions become relatively dense; as a result, after sintering, the thin-walled portions relatively swell toward the outer peripheral faces. As a result, when the insert formed of such a sintered compact is clamped such that the outer peripheral faces along sides between corners are pressed against the seating surface of the pocket of the holder, the outer peripheral faces along the sides are in point contact with the seating surface in microscopic view, potentially resulting in wobbling, which is unfavorable to stable clamping.

By contrast, in the present invention, since the breaker groove divides the rake face located at the outer peripheral face corresponding to the thin-walled portion into front and back portions, the occurrence of swelling mentioned above is prevented, and the outer peripheral face can be in two-point contact with the seating surface, whereby clamping is stabilized. That is, the present invention yields a remarkable secondary effect on clamping of the insert. For example, as mentioned above, a triangular tip is clamped as follows: the triangular tip is placed in the pocket in an upright position with two downward-facing sides of a triangle in contact with the V-shaped seating surface, and a screw is inserted through the hole of the tip and screwed into the threaded hole provided in the side wall of the pocket in such a manner as to press the tip against the side wall. In this case, since the breaker groove divides, into front and rear portions, each of the two sides (rake faces) of the triangle which are brought into contact with a front seating surface and a rear seating surface, respectively, of the V-shaped seating surface, each rake face is pressed against the corresponding seating surface at two points; i.e., a front point and a rear point separated by the breaker groove, so that the tip can be clamped stably in a seated posture.

MODES FOR CARRYING OUT THE INVENTION

Figure 1:
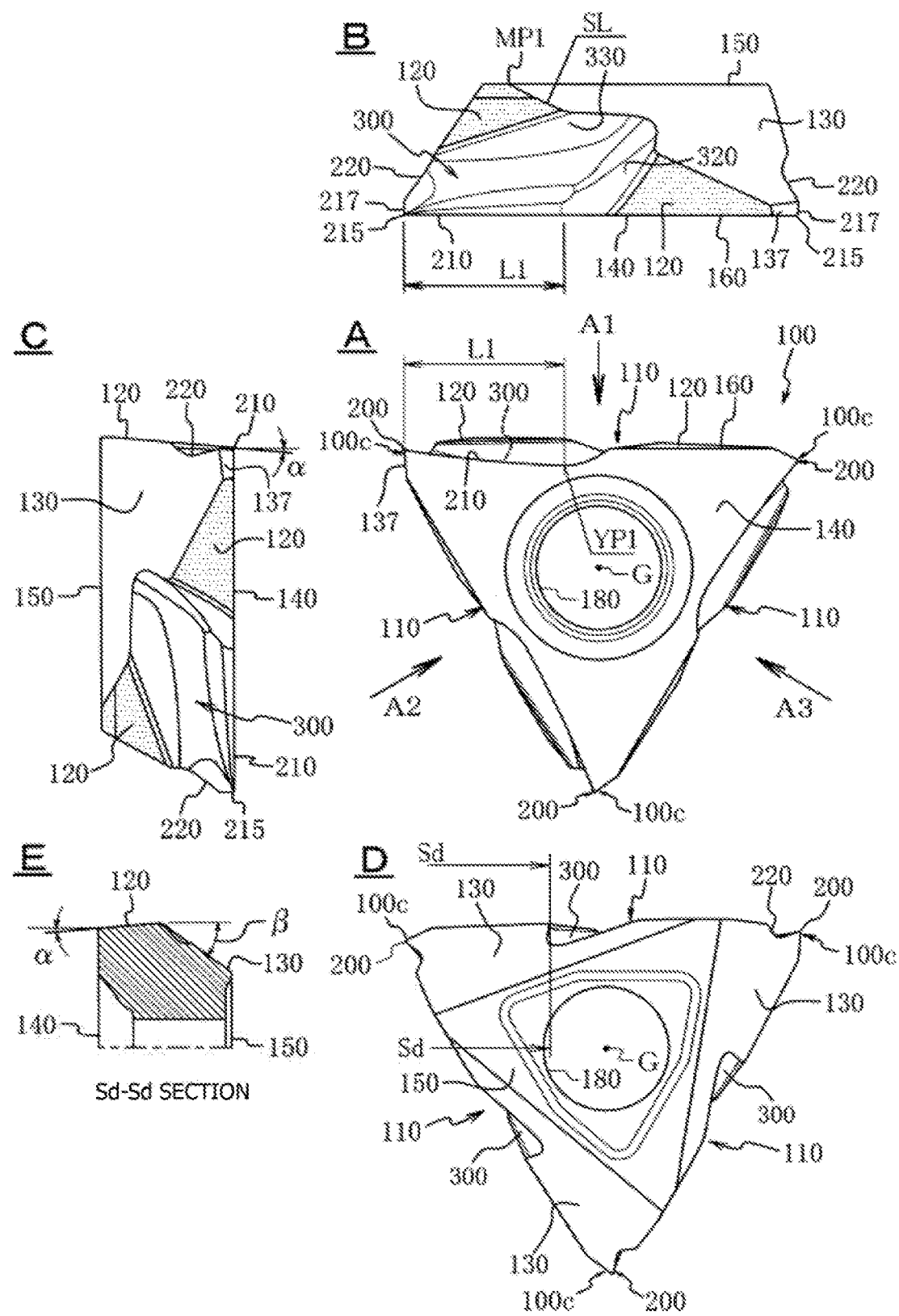
FIG. 1 Set of explanatory views showing an embodiment of a cutting insert of the present invention, wherein A is a view of side cutting edges as viewed from a flank side; B is an A1 arrow view as viewed from a rake face side (A2 and A3 arrow views identical to A1 arrow view); C is a left side view of A (view from end flank side); D is a rear view of A; and E is a sectional view taken along line Sd-Sd of D.
Figure 2:
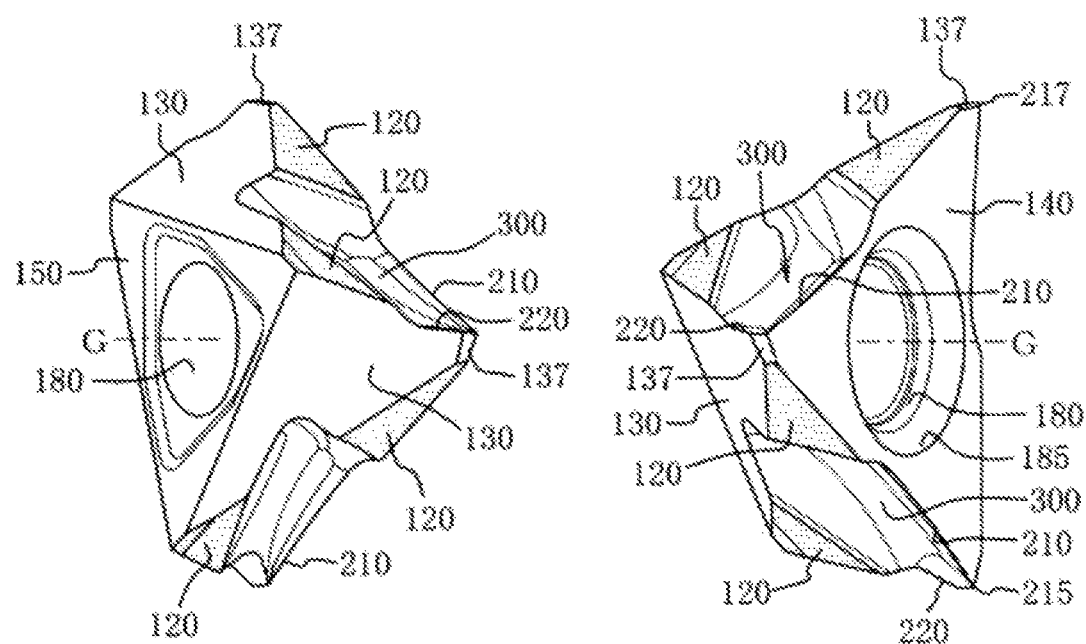
FIG. 2 Set of views for explaining the shape and structure of the cutting insert of FIG. 1, wherein the right view is a perspective view of FIG. 1-C viewed from upper right, and the left view is a perspective view of FIG. 1-C viewed from upper left.
Figure 3:
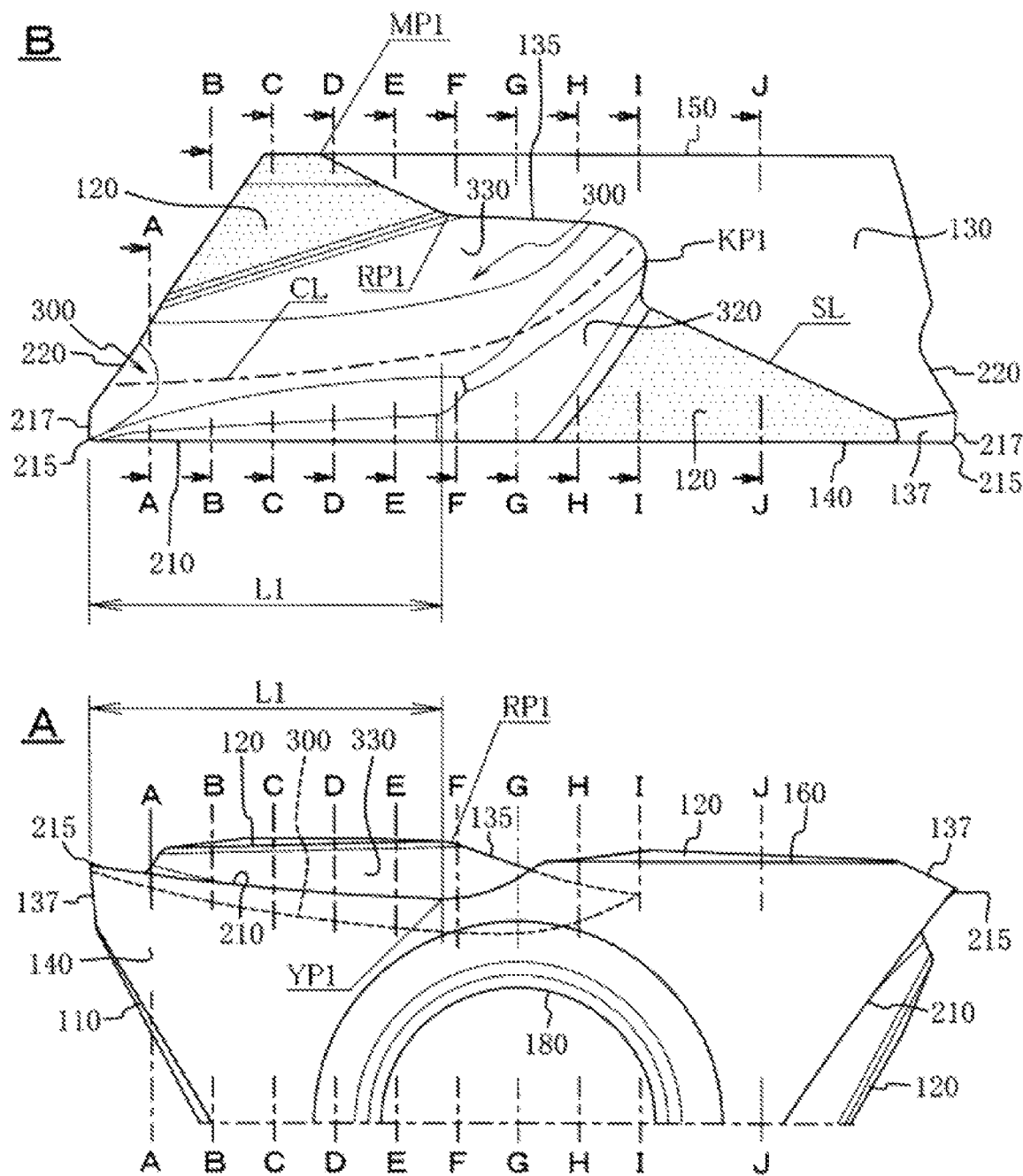
FIG. 3 A is a fragmentary enlarged view of FIGS. 1-A, and B is an enlarged view of FIG. 1-B.
Figure 4:
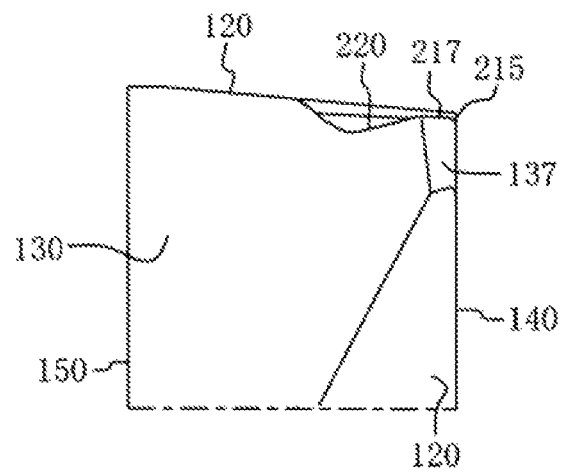
FIG. 4 View of FIG. 3-A as viewed from the left side (left side view).
Figure 5:
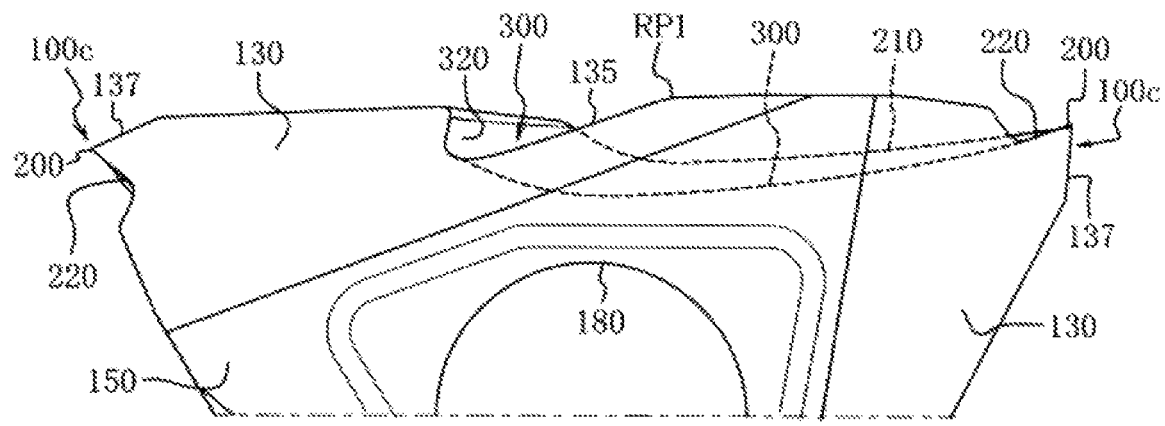
FIG. 5 Rear view of FIG. 3-A (viewed from the other polygonal face side).

An embodiment of a cutting insert of the present invention will next be described in detail with reference to FIGS. 1 to 7. A cutting insert 100 of the present embodiment is used for front external machining and is formed by use of a regular-triangle plate as a base as follows: cutting edges 200 each having a rake face 120 present at an outer peripheral face (peripheral portion located toward a corner) 110 of the triangle are provided at three corners 110*c*, respectively, of the triangle, rotationally symmetrically about a center axis G of the triangle (polygon) at three intervals (120 degrees) while having the same shape (see FIG. 1-A, etc.). The three cutting edges are provided at the corners 100*c* to be rotationally symmetrical, and have the same size, shape, and structure. Thus, a certain one of the cutting edges 200, the rake face 120 of the certain cutting edge, etc., will be described, centering on the shape and structure of the outer peripheral face (face along a side of the triangle) 110 of the triangle which extends between the two adjacent corners 100*c* and which forms the rake face 120 of the certain cutting edge 200.

In the cutting insert 100 of the present embodiment, each of the cutting edges (three cutting edges) 200 has a side cutting edge (major cutting edge) 210 formed along an intersection ridge (side cutting edge formation portion) 160 between one triangular face (polygonal face) 140 and the outer peripheral face 110 extending along a side of the triangle between the two adjacent corners 100*c* (see FIGS. 1-A, 3-A, etc.). An end cutting edge (minor cutting edge) 220 is formed at each of the corners 100*c* of the triangle while the rake face 120 is present at the outer peripheral face 110 of the triangle. As viewed from above the rake face 120, the end cutting edge 220 forms an acute angle with the side cutting edge 210 with a nose 215 intervening therebetween (see FIGS. 1-B, 3-B, etc.). Specifically, when the rake face 120 is viewed from above (see FIGS. 1-B, 3-B, etc.), the end cutting edge 220 is formed in such a manner as to extend obliquely rearward from a front end portion of the side cutting edge 210 with the nose 215 intervening therebetween, for example, at a crossing angle of the two edges of 60 degrees. A length range (predetermined range) L1 of effective edge portion of the side cutting edge 210, which portion is used for cutting, ranges rearward along the intersection ridge 160 from the front end (nose 215) of the end cutting edge 220 up to an intermediate portion of a side of the triangle. As a result of formation of a breaker groove 300 to be described later, the side cutting edge (cutting ridge) 210 is formed such that, in the predetermined range L1 ranging rearward from the front end (nose 215) of the side cutting edge 210, the side cutting edge 210 descends in relation to the rake face 120 with increasing distance rearward from the front end (see FIGS. 1-A, 3-A, etc.); further, the side cutting edge 210 is rounded arcuately upward at the rear end of the length range L1 of the effective edge. The side cutting edge 210 will be described in detail in the description of the breaker groove 300.

Meanwhile, when the rake face 120 of the certain cutting edge 200 is viewed from above (see FIGS. 1-B, 3-B, etc.), the outer peripheral face 110 of the triangle (face along a side of the triangle) extending between the two adjacent corners 110*c* forms the rake face 120 of the certain cutting edge 200, and a flank (end flank) 130 of the end cutting edge 220 of another cutting edge 200 located on the side of the rake face 120 toward the corner 100*c* opposite the corner 100*c* having the end cutting edge 220 (left end cutting edge 220 in FIGS. 1-B and 3-B). The rake face 120 is a planar (generally planar) area (planar area excluding the breaker groove 300 to be described later) located toward the nose 215 (lower left in FIGS. 1-B and 3-B) of the certain cutting edge 200 with respect to a boundary represented by a straight line (an imaginary straight line) SL sloping downward to the right in FIGS. 1-B and 3-B and connecting a position MP1 located rearward of the rear end (upper left end in FIGS. 1-B and 3-B) of the end cutting edge 220 of the certain cutting edge 200 and a rear end portion (a portion in the vicinity of the nose 215 of the other cutting edge 200) of the intersection ridge (side cutting edge formation portion) 160 extending rearward from the side cutting edge 210. Notably, in the present embodiment, the rear end of the rake face 120 is a rear end portion of the side cutting edge 210 (a portion in the vicinity of the nose 215 of the other cutting edge 200) for the following reason: since the nose 215 has a very narrow wiper edge 217, a very small end flank 137 corresponding to the wiper edge 217 of the other cutting edge 200 at the other, adjacent corner 100*c* is present at the rear end portion (right end portion in FIGS. 1-B and 3-B) of the side cutting edge 210.

The rake face (rake face area) 120 is formed along the side cutting edge 210 and the intersection ridge 160 extending rearward from the side cutting edge 210 such that the rake face 120 slopes downward toward the side cutting edge 210 and upward toward a side opposite the side cutting edge 210 (toward the other polygonal face 150) between the end cutting edge 220 of the certain cutting edge 200 and the end cutting edge 220 of the other, adjacent cutting edge 200 located rearward of the certain cutting edge 200. Thus, in the present embodiment, the rake face 120 partially constituting a face (outer peripheral face) along a side of the triangle has a fixed negative side rake angle α along the front-rear direction of the intersection ridge 160 including the side cutting edge 210 such that the rake face 120 slopes appropriately (e.g., at 5 degrees) with respect to the horizon (see FIGS. 6, 7, etc.).

Meanwhile, in the outer peripheral face (face along a side of the triangle) 110 between the two adjacent corners 100*c*, an area excluding the rake face 120 of the certain cutting edge 200 and located opposite the rake face 120 with respect to the straight line SL serving as the boundary; i.e., the flank (flank formation area) 130 of the end cutting edge 220 of the other cutting edge 200, is formed in such a manner as to assume a single plane and to intersect with the rake face 120 on the above-mentioned straight line SL so as to provide an appropriate relief angle in cutting with the other cutting edge 200. In the present embodiment, the flank 130 has a positive slope in opposition to the slope having a negative side rake angle α of the rake face 120; specifically, the flank 130 slopes at a relatively large fixed (constant) angle β of, for example, 35 degrees with respect to the horizon along the front-rear direction of the side cutting edge 210 (see FIGS. 6, 7, etc.). That is, the flank 130 is formed in such a manner as to slope upward toward the side cutting edge 210 and downward toward a side opposite the side cutting edge 210 (toward the other polygonal face 150). The greater the angle β, the larger the formed outlet or passage for discharge of a chip when the breaker groove 300, which will be described later, is formed in such a manner as to cut into the flank 130. The flank 130 of the end cutting edge 220 of the certain cutting edge 200 is shown in FIG. 1-C, and is rotationally symmetrical with and has the same shape and structure as those of the flank 130 of the end cutting edge 220 of the above-mentioned other cutting edge 200.

Since, as mentioned above, the very narrow wiper edge 217 is provided at the front end of the end cutting edge 220 connected to the front end (nose 215) of the side cutting edge 210, the end flank 137 of the wiper edge 217 of each cutting edge 200 is cut so as to impart an appropriate end relief angle to the wiper edge 217 (FIGS. 1-A, 3-A, etc.). As a result, in the present embodiment, the outer peripheral face (face along a side of the triangle) 110 between the two adjacent corners 100*c* is formed substantially of two planes except for the breaker groove 300 to be described next; specifically, the plane of the rake face 120 of the certain cutting edge 200 and the plane of the flank 130 of the end cutting edge 220 of the other cutting edge 200, which intersect with each other to form a straight ridge (straight line SL). The outer peripheral faces 110 along the respective sides of the triangle are formed in rotational symmetry of 120 degrees.

Next will be described an essential portion of the cutting insert 100; i.e., the breaker groove 300 formed in the rake face 120 in a depressed manner. In the present embodiment, the breaker groove 300 extends rearward along the side cutting edge 210 while its front end arcuately cuts a front end portion of the end cutting edge 220. As viewed in a cross section taken perpendicular to the side cutting edge 210 or the intersection ridge 160, the breaker groove 300 is formed such that at least its bottom portion is arcuate and such that its side walls (groove walls) located along its opposite edges slope at an angle of 30 degrees to 50 degrees with respect to the horizon as will be described later. A rear end KP1 portion of the groove 300 cuts into the flank 130 of the end cutting edge 220 of the other, adjacent cutting edge 200, the flank 130 having a positive slope at a relatively large slope angle β in opposition to the rake face 120 having the above-mentioned negative side rake angle α; as a result, the groove 300 divides the rake face 120 into front and rear portions (see FIGS. 3, 5, etc.). In the present embodiment, the breaker groove 300 is formed such that, as viewed from above the rake face 120, at a position which is located near the rear end KP1 of the breaker groove 300 and at which the rake face 120 is divided into front and rear portions, a side wall of the breaker groove 300 along the side cutting edge 210 extends linearly toward a side opposite the side cutting edge 210 and cuts into the flank 130 of the end cutting edge 220 of the other, adjacent cutting edge 200.

Meanwhile, as mentioned above, as a result of formation of the breaker groove 300, the side cutting edge (cutting ridge) 210 is formed such that, in the predetermined range L1 ranging rearward from the front end (nose 215) of the side cutting edge 210, the side cutting edge 210 descends in relation to the rake face 120 with increasing distance rearward from the front end. Further, the side cutting edge 210 is rounded arcuately upward at the rear end of the predetermined range L1; however, as shown in the cross sections of FIGS. 6 and 7, the side cutting edge (cutting ridge) 210 has a sharp edge. A dash-dot line CL in FIG. 3-B indicates the lowest portion (deepest portion) of a groove bottom 305 of the breaker groove 300 in a cross section thereof. The breaker groove 300 is formed such that, when the rake face 120 is viewed from above, as indicated by the dash-dot line CL, the lowest portion recedes from the side cutting edge 210 with increasing distance rearward from the front end (nose 215) of the side cutting edge 210.

As viewed from above the rake face 120 (see FIGS. 1-B and 3-B), of side walls of the breaker groove 300, a side wall 330 facing the side cutting edge 210 extends rearward linearly from an intermediate portion of the end cutting edge 220 in such a manner as to slope toward a side opposite the side cutting edge 210 (toward the other polygonal face 150). As a result of the breaker groove 300 cutting into the flank 130, at the boundary between the side wall (side wall surface) 330 and the flank 130, an intersection ridge 135 is formed as a result of the side wall 330 and the flank 130 intersecting with each other and extends rearward toward a bottom portion at the rear end KP1 of the breaker groove 300. Further, the breaker groove 300 is formed such that the position RP1 of the front end of the intersection ridge 135; i.e., the position RP1 of the rear end of a front portion (front rake face 120) of the rake face 120 divided by the breaker groove 300, corresponds to the rear end of the length range (predetermined range) L1 of an effective edge portion of the side cutting edge 210 or the vicinity of the rear end (neighborhood of the rear end), as viewed in the front-rear direction of the side cutting edge 210.

The breaker groove 300 is formed such that its groove width Wm gradually increases (gradually widens) in a rearward direction from its front end over the predetermined range L1. By contrast, the groove width Wm of a portion of the breaker groove 300 located toward the rear end KP1 and cutting into the flank 130 of the end cutting edge 220 of the other, adjacent cutting edge 200 gradually reduces toward the rear end KP1. The breaker groove 300 is formed such that, as viewed in the above-mentioned cross section, the groove bottom 305 is arcuate and its opposite side walls slope as follows: the side wall located toward the side cutting edge 210 slopes at an angle of about 30 degrees with respect to the horizon, and the side wall located on the side opposite the side cutting edge 210 (located toward the other polygonal face 150) slopes at an angle of about 40 degrees with respect to the horizon.

Figure 6:
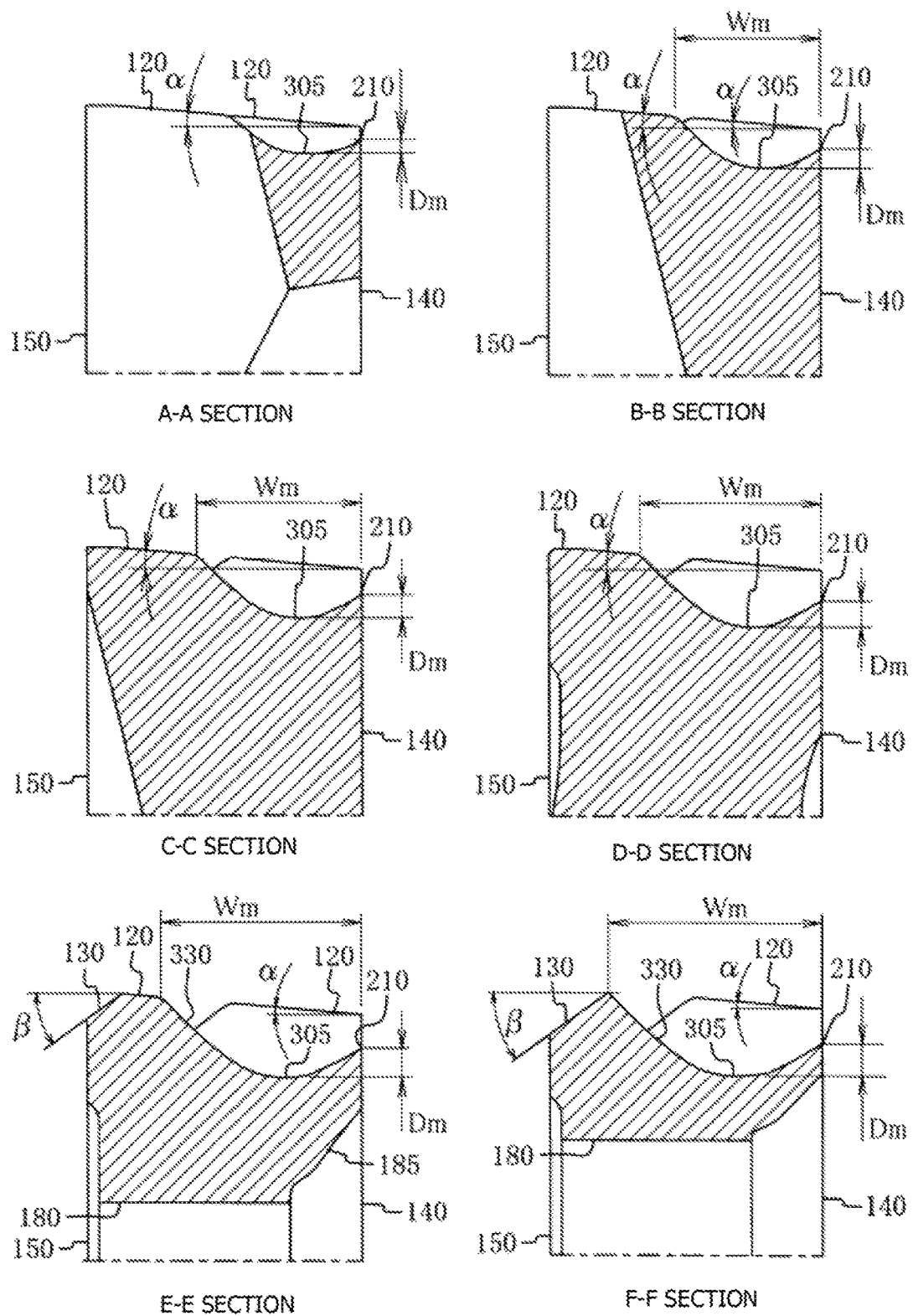
FIG. 6 Sectional views of FIG. 3 (A-A section to F-F section).
Figure 7:
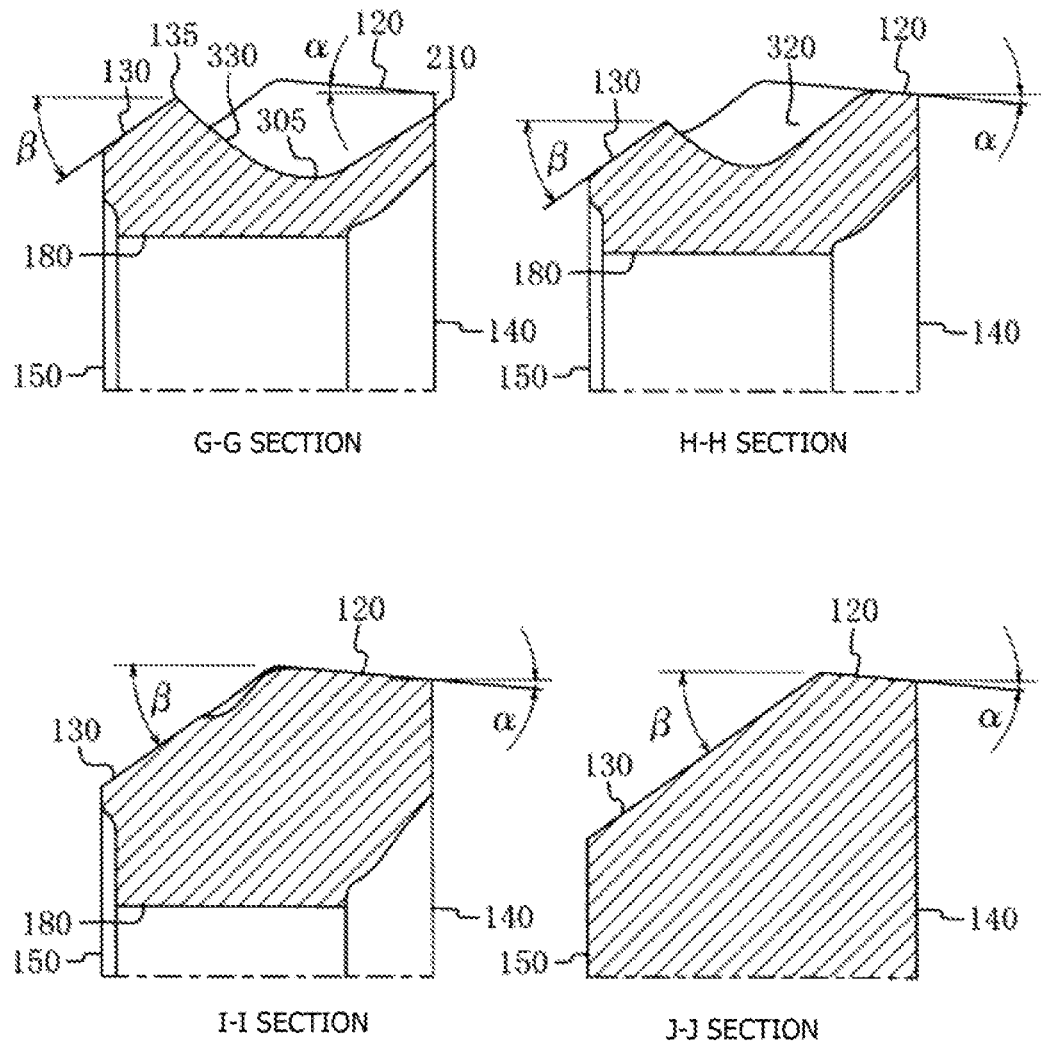
FIG. 7 Sectional views of FIG. 3 (G-G section to J-J section).

In the present embodiment, as mentioned above, the side cutting edge 210 is formed such that, in the predetermined range (length range of the effective edge portion of the side cutting edge 210) L1 ranging rearward from the front end of the side cutting edge 210, the side cutting edge 210 descends in relation to the rake face 120 with increasing distance rearward from the front end. The upper end (cutting ridge) of the side cutting edge 210 and the depth Dm of the breaker groove 300 are in the following relation. The breaker groove 300 is formed such that the groove depth Dm from the side cutting edge 210 to the lowest portion of the groove bottom 305 as viewed in a cross section increases with increasing distance rearward from the front end of the side cutting edge 210, up to a rear end YP1 of the predetermined range L1 or its vicinity, as shown in FIGS. 6-A to 6-F. Further, the breaker groove 300 is formed such that the lowest portion of the groove bottom 305 ascends with increasing distance rearward from the rear end YP1 or its vicinity at which the groove depth Dm is the deepest (see FIGS. 7-G and 7-H). Notably, the insert 100 of the present embodiment has a hole (circular hole) 180 formed therethrough at the centers (center axis G) of the triangular faces (polygonal faces), one of which has a taper seat 185 formed therein, for allowing insertion of a clamp screw.

Figure 8:
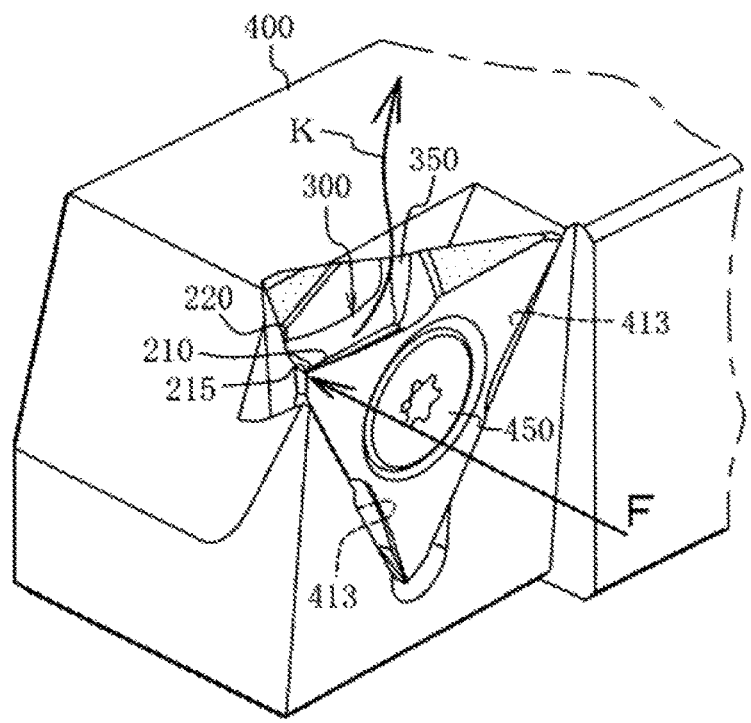
FIG. 8 Explanatory view showing a cutting tool formed by clamping the cutting insert of FIG. 1 in a pocket located at the front end of a holder, or downward perspective view of the insert as viewed from a side flank side.
Figure 9:
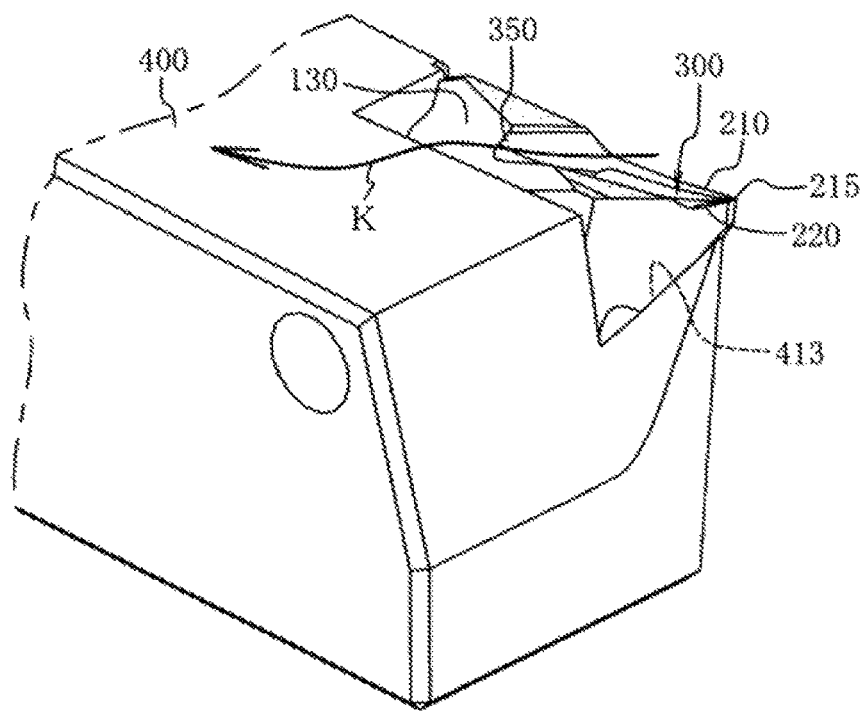
FIG. 9 Explanatory view showing a cutting tool formed by clamping the cutting insert of FIG. 1 in a pocket located at the front end of a holder, or downward perspective view of the insert as viewed from a side opposite the side flank.
Figure 10:
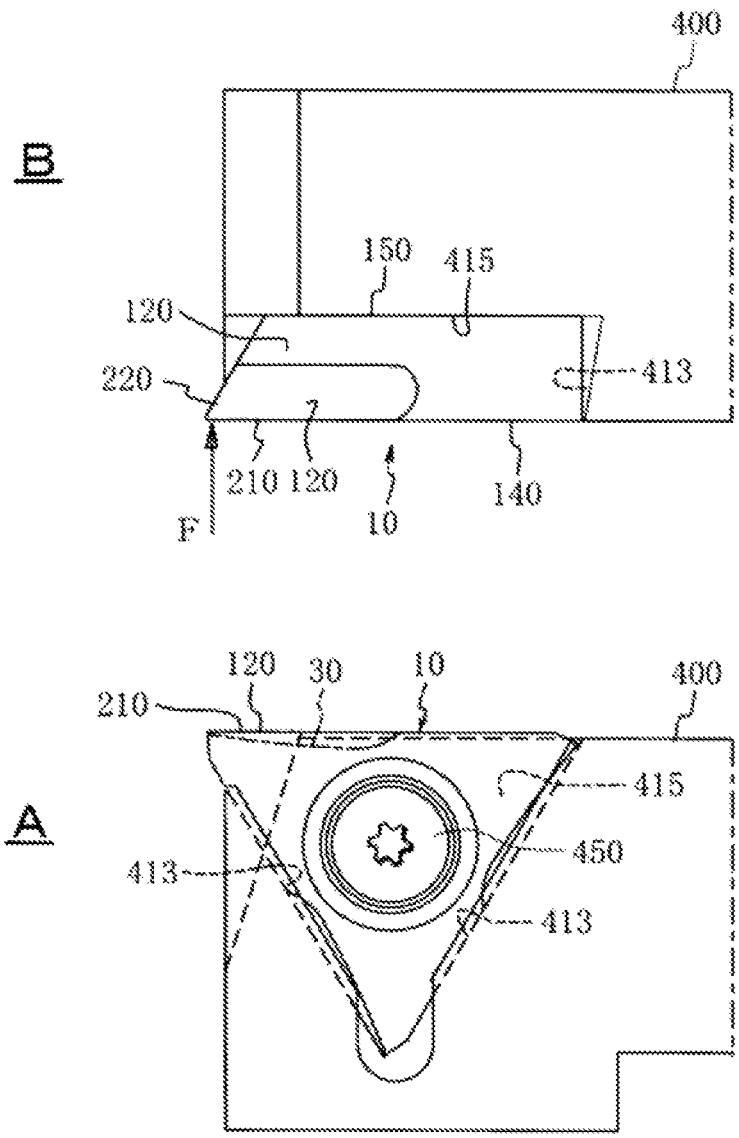
FIG. 10 Set of explanatory views for explaining a state in which the vertical cutting insert (triangular tip) used for external machining accompanied by tapering is clamped in the pocket of the holder, wherein A is an explanatory view as viewed from the side flank side, and B is an explanatory view as viewed from above the rake face.

The thus-formed cutting insert 100 of the present embodiment is placed in an upright position on the seating surface (tip seat) 413 of the V-shaped pocket of the predetermined holder 400 as shown in FIGS. 8 and 9 and clamped by screwing the predetermined clamp screw 450, thereby forming a cutting tool used for front external machining (lathe turning) including tapering from a large diameter to a small diameter. The pocket of the holder 400 for such clamping has the V-shaped seating surface (tip seat) 413, and the seating surface 413 has a slope angle corresponding to the negative side rake angle $\alpha$ given to the above-mentioned rake face 120. Therefore, even when a large cross feed component of force F in cutting is imposed on the insert 100, a positional shift or separation of the insert 100 from the side wall of the pocket can be prevented as in a conventional case.

Further, when the side cutting edge 210 is cross-fed with a predetermined depth of cut for performing external machining, even though the rake face 120 has a negative side rake angle $\alpha$, a generated chip K can be discharged rearward through a rearward invasive cut portion of the breaker groove 300 at the rear end thereof, which portion serves as an outlet or passage (see FIGS. 8 and 9). Specifically, in the cutting insert 100 of the present embodiment, since the breaker groove 300 of the cutting edge 200 cuts into the flank 130 of the end cutting edge 220 of the other, adjacent cutting edge 200 located rearward of the end cutting edge 220 of the certain cutting edge 200, the chip K is allowed to flow rearward along such an invasive cut portion 350 serving as a passage. Therefore, the cutting insert 100 of the present embodiment allows the chip K to be smoothly discharged in a direction receding from the side cutting edge 210 in contrast to a conventional cutting insert which has the breaker groove 300 but is rounded upward in the rake face 120 without employment of such an invasive cut portion at a rear end portion of the breaker groove 300, so that a chip generated in external machining flows along the rake face sloping at a negative side rake angle at the rear end of the beaker groove 300. Thus, contact of the chip K with the machined surface (finished surface) of the workpiece can be prevented, whereby deterioration in roughness of the machined surface is prevented. In this manner, the insert 100 of the present embodiment yields a characteristic effect of enhancing chip treatability without involvement of deterioration in clamping force of the insert 100.

Particularly, in the present embodiment, as mentioned above, since the breaker groove 300 is formed such that, at a position located toward the rear end of the breaker groove 300 dividing the rake face 120 into front and rear portions, the side wall (groove wall) 320 of the breaker groove 300 along the side cutting edge 210 extends toward the side opposite the side cutting edge 210 (toward the other polygonal face 150), the chip K can be further actively led toward the side opposite the side cutting edge 210. Therefore, contact of a chip with the machined surface can be further reduced. Moreover, in the present embodiment, since the breaker groove 300 is formed such that the lowest portion of the groove bottom 305 recedes from the side cutting edge 210 with increasing distance rearward from the front end (nose 215) of the side cutting edge 210, a chip can be more actively led toward the side opposite the side cutting edge 210; therefore, the chip can be discharged in a well-controlled direction.

Also, in the present embodiment, since the side cutting edge 210 (in the effective length range L1 of the side cutting edge 210) descends in relation to the rake face 120 with increasing distance rearward from the front end, cutting resistance can be reduced, and the side wall (upper end) 330 defining the breaker groove 300 and facing the side cutting edge 210 becomes relatively higher than the upper end (cutting ridge) of the side cutting edge 210, with increasing distance rearward from the front end, up to the rear end YP1 of the predetermined range L1 or its vicinity. Thus, even though the side wall 330 hinders the flow of a chip flowing away from the machined surface in the predetermined range L1, as a result of the breaker groove 300 cutting into the flank 130 in a region located rearward of the position RP1 of the front end of the intersection ridge 135, the side wall 330 sharply reduces in level to thereby actively form an outlet for chips, thereby yielding an effect of actively leading the chips to the invasive cut portion.

Also, in the present embodiment, since the breaker groove 300 is formed such that the groove width Wm increases with increasing distance rearward from the front end of the side cutting edge 210, up to the rear end YP1 of the predetermined range L1 or its vicinity and such that the groove width Wm reduces toward the rear end of the breaker groove 300 in a region near the rear end of the breaker groove 300, chip treatability can be enhanced even for a chip having a large width as a result of cutting with a large depth of cut. Meanwhile, since the groove width Wm of a portion of the breaker groove 300 located toward the rear end of the breaker groove 300 gradually reduces toward the rear end, there is yielded an effect of controlling or limiting the direction of discharge of a chip. As a result, even in performing external machining which produces a wide chip, the chip can be discharged in a well-controlled direction. Further, in the present embodiment, since the breaker groove 300 is formed such that the groove depth Dm from the side cutting edge 210 to the lowest portion of the groove bottom 305 increases, with increasing distance rearward from the front end of the side cutting edge 210, up to the rear end YP1 of the predetermined range L1 or its vicinity and such that the lowest portion of the groove bottom 305 ascends with increasing distance rearward from the deepest portion, treatability for even a wide chip can be further enhanced. As mentioned above, even in performing external machining with a large depth of cut accompanied by tapering from a large diameter to a small diameter, by virtue of its characteristic structure, the insert 100 of the present embodiment provides a large clamping force against a cross feed component of force as well as excellent chip treatability.

The present invention is not limited to the above embodiment, but may be embodied through appropriate modifications without departing from the spirit and scope of the invention. Specifically, the acute angle between the side cutting edge and the end cutting edge may be determined appropriately in accordance with a feed angle during taper machining or the like such that the end cutting edge does not interfere with the machined surface. So long as an outer peripheral face between two adjacent corners contains the rake face of the certain cutting edge and the flank of the end cutting edge of the other, adjacent cutting edge, the outer peripheral face may be such that the area of the rake face and the area of the flank are in an appropriate ratio or such that the boundary between the rake face and the flank is modified as appropriate, and the outer peripheral face may not be flat before a breaker is formed.

The negative side rake angle of slope of the rake face may be determined as appropriate. Also, there may be determined as appropriate the angle of the positive slope of the flank of the end cutting edge of another, adjacent cutting edge, the flank sloping downward toward the side opposite the side cutting edge at an angle of a positive slope opposite a slope having the negative side rake angle. As mentioned above, the greater the positive slope angle, the larger the outlet (passage) formed at the rear end of the breaker groove, whereby flow of a chip can be facilitated. In the above embodiment, these angles are fixed with respect to the front-rear direction along the side cutting edge; however, in the present invention, the angles may not be fixed. The cross section of the breaker groove and the relation between the groove width and the groove depth may be determined according to machining conditions.

In view of total merit including insert manufacturing cost, it is preferred for the cutting insert according to the present invention to have a generally triangular shape as a polygonal shape and to have cutting edges provided at its three corners, respectively; however, the present invention is not limited thereto. Specifically, the shape of the cutting insert according to the present invention is not limited to a triangle, but may be another polygon as mentioned above. The cutting insert according to the present invention is embodied for use in front external machining, but may be applied to rear external machining, and is apparently not limited to a tip having a hole. The material for the insert may be publicly known various other materials such as cemented carbide.

DESCRIPTION OF REFERENCE NUMERALS AND SYMBOLS

100: cutting insert; 100c: corner of polygon; 110: outer peripheral face; 120: rake face; 130: flank of end cutting edge; 140: one polygonal face; 150: the other polygonal face; 160: intersection ridge between one polygonal face and outer peripheral face; 180: hole for allowing insertion of clamp screw; 200: cutting edge; 210: side cutting edge; 215: nose (front end of side cutting edge); 220: end cutting edge; 300: breaker groove; 305: groove bottom of breaker groove; 315: position of front end of intersection ridge between flank and side wall facing side cutting edge; 320: side wall of breaker groove along side cutting edge; 330: side wall of breaker groove facing side cutting edge; α: negative side rake angle; β: positive slope (angle); G: center axis of polygon; CL: line indicative of rearward extension of lowest portion of groove bottom from front end of side cutting edge as viewed from above rake face; L1: predetermined range extending rearward from front end of side cutting edge; RP1: position of front end of intersection ridge between flank and side wall facing side cutting edge; Wm: groove width of breaker groove; and Dm: groove depth of breaker groove from side cutting edge to lowest portion of groove bottom.

What is claimed is:

1. A cutting insert which has an approximately polygonal plate-like shape and is used for external machining and in which cutting edges are formed at respective corners of the polygonal cutting insert in the same shape and in rotational symmetry about a center axis of the polygonal cutting insert with their rake faces present on respective outer peripheral faces of the polygonal cutting insert, characterized in that:

each of the cutting edges includes a side cutting edge formed along an intersection ridge between one polygonal face and the outer peripheral face between two adjacent corners, and an end cutting edge formed at the corresponding corner in such a manner as to form an acute angle with the side cutting edge with a nose intervening therebetween;

the outer peripheral face between the two adjacent corners includes a rake face of a certain cutting edge associated with the outer peripheral face and a flank of the end cutting edge of another, adjacent cutting edge, and the rake face of the certain cutting edge has a negative side rake angle such that the rake face slopes downward toward the side cutting edge and upward toward a side opposite the side cutting edge between the end cutting edge of the certain cutting edge and the end cutting edge of the other, adjacent cutting edge located rearward of the end cutting edge of the certain cutting edge;

the flank of the end cutting edge of the other, adjacent cutting edge has a positive slope in opposition to the slope having the negative side rake angle such that the flank slopes downward toward a side opposite the side cutting edge; and a breaker groove is formed on the rake face of the certain cutting edge such that the breaker groove extends rearward along the side cutting edge from a front end of the side cutting edge and cuts into the positively sloped flank of the end cutting edge of the other, adjacent cutting edge, thereby dividing the rake face into front and rear portions.

2. A cutting insert according to claim 1, wherein the breaker groove is formed such that, at a position which is located near a rear end of the breaker groove and at which the breaker groove divides the rake face into the front and rear portions, a side wall of the breaker groove along the side cutting edge extends toward a side opposite the side cutting edge.

3. A cutting insert according to claim 1, wherein the breaker groove is formed such that a lowest portion of a groove bottom recedes from the side cutting edge with increasing distance rearward from the front end of the side cutting edge.

4. A cutting insert according to claim 1, wherein the side cutting edge is formed such that, in a predetermined range extending rearward from the front end of the side cutting edge, the side cutting edge descends in relation to the rake face with increasing distance rearward from the front end, and the breaker groove cuts into the flank such that the position of a front end of an intersection ridge between the flank and a side wall defining the breaker groove, facing the side cutting edge, and cutting into the flank is located opposite a rear end of the predetermined range or its vicinity with the breaker groove intervening therebetween.

5. A cutting insert according to claim 4, wherein the breaker groove is formed such that the breaker groove has a groove width which increases with increasing distance rearward from the front end of the side cutting edge, up to the rear end of the predetermined range or its vicinity and which decreases toward the rear end of the breaker groove in a region near the rear end of the breaker groove.

6. A cutting insert according to claim 4, wherein the breaker groove is formed such that a groove depth from the side cutting edge to the lowest portion of the groove bottom increases with increasing distance rearward from the front end of the side cutting edge, up to the rear end of the predetermined range or its vicinity and such that the lowest portion of the groove bottom ascends with increasing distance rearward from the rear end or its vicinity at which the groove depth is the deepest.

7. A cutting insert according to claim 1, wherein a hole for allowing insertion of a clamp screw therethrough is formed therein at centers of the polygonal faces.

* * * * *